(12) United States Patent
Knudtzon (10) Patent No.: US 11,600,943 B2
(45) Date of Patent: Mar. 7, 2023

(54) PLUG CAP ASSEMBLY (71) Applicant: DEFA AS, Nesbyen (NO)

(72) Inventor: Nicolay Knudtzon, Nesbyen (NO)

(73) Assignee: DEFA AS, Nesbyen (NO)

(*) Notice: Subject to any disclaimer, the term of this patent is extended or adjusted under 35 U.S.C. 154(b) by 40 days.

(21) Appl. No.: 17/031,568

(22) Filed: Sep. 24, 2020

(65) Prior Publication Data

US 2021/0135396 A1 May 6, 2021

(51) Int. Cl.
*H01R 13/52* (2006.01)
*B60L 53/16* (2019.01)

(52) U.S. Cl.
CPC .......... *H01R 13/5213* (2013.01); *B60L 53/16* (2019.02); *H01R 2201/26* (2013.01)

(58) Field of Classification Search
CPC .... H01R 13/5213; H01R 13/46; H01R 13/60; H01R 13/64; H01R 2201/26; B60L 53/16
USPC ................................ 439/134–140, 149, 451
See application file for complete search history.

(56) References Cited

U.S. PATENT DOCUMENTS

| | | | | |
|---|---|---|---|---|
| 1,978,510 A * | 10/1934 | Spence, Jr. | .......... | H01R 13/621 439/135 |
| 3,129,993 A * | 4/1964 | Ross | ....... | H01R 13/64 439/294 |
| 3,271,726 A * | 9/1966 | Pfendler | ........ | H01R 24/84 439/76.1 |
| 4,411,040 A * | 10/1983 | Sharrow | ........ | A63B 47/04 15/104.94 |
| 4,731,032 A * | 3/1988 | Noorily | ........ | H01R 13/443 439/136 |
| 4,997,394 A * | 3/1991 | Katz | ........ | H01H 85/201 337/186 |
| 6,523,229 B2 * | 2/2003 | Severson | ........ | B65D 63/1018 24/16 PB |
| 6,676,422 B1 * | 1/2004 | Baker | ........ | H01R 13/447 439/135 |
| 7,442,077 B2 * | 10/2008 | Peress | ........ | H01R 13/465 439/135 |
| 8,025,168 B2 * | 9/2011 | Bullard | ........ | A61J 9/00 215/11.1 |

(Continued)

FOREIGN PATENT DOCUMENTS

CN 201682134 U 12/2010
EP 2485338 A1 8/2012

OTHER PUBLICATIONS

Norwegian Search Report received for Norwegian Patent Application No. 20191316, dated Jun. 5, 2020, 2 pages.

*Primary Examiner* — Vanessa Girardi
(74) *Attorney, Agent, or Firm* — Morrison and Foerster LLP (57) ABSTRACT

A plug cap assembly for use on a plug (10) comprises a plug cap (20) configured for releasable arrangement on at least a part of a plug head portion, and comprises a flexible connection member (21) having a first end and a second end, a flexible connection (23) between a cap top portion (26) and said second end, and a connection element (24; 24') releasably connected to the plug or to a cable (9). The flexible connection member may be moved with respect to the connection element and a suspended length (1) may be adjusted such that it is less than a distance (d) between the suspension structure (25) and an adjacent vehicle body (3).

12 Claims, 5 Drawing Sheets

(56) References Cited

U.S. PATENT DOCUMENTS

| | | | |
|---|---|---|---|
| 8,747,129 B2* | 6/2014 | Ichio | B60L 53/16 |
| | | | 439/135 |
| 9,040,822 B2* | 5/2015 | Nieto Lopez | H02G 1/00 |
| | | | 174/74 A |
| 9,279,944 B1* | 3/2016 | Miller | H01R 13/746 |
| 2006/0084293 A1* | 4/2006 | Jeong | B60R 16/027 |
| | | | 439/76.2 |
| 2012/0260487 A1* | 10/2012 | Nichols | B65D 23/106 |
| | | | 215/243 |
| 2014/0197789 A1* | 7/2014 | Ono | B60L 50/66 |
| | | | 320/109 |
| 2019/0067870 A1* | 2/2019 | Tang | H01R 13/5833 |
| 2020/0384870 A1* | 12/2020 | Matsui | B60L 53/16 |

* cited by examiner

PLUG CAP ASSEMBLY

CROSS REFERENCE TO RELATED APPLICATIONS

This application claims priority to NO 20191316, filed Nov. 5, 2019, the disclosures of which are herein incorporated by reference in their entirety.

TECHNICAL FIELD OF THE INVENTION

The invention concerns electrical connectors and in particular electrical connectors on cables which are used to connect an electric vehicle to a charging station. In particular, the invention concerns a plug cap assembly.

BACKGROUND OF THE INVENTION

Electrical vehicles have batteries that typically are charged by means of a cable which is connected between a charging station and a receptacle on the vehicle. The connection between the cable and the receptacle is made by a designated plug, for example of the kind illustrated in FIG. 1. This plug 10 comprises a handle portion 11 at an end of a cable 9 and a head portion 12. The head portion comprises a number of female contact members (receptacles) 13 recessed in a collar 14, in the following also referred to as the plug end. The collar 14 is designed to fit into a complementary shaped receptacle (not shown) and the female receptacles 13 are designed to receive complementary shaped male contact pins (not shown), in the electric vehicle.

When the charging cable is not in use and disconnected from the vehicle, the plug head portion is oftentimes covered by a protective cap to prevent the contact members (receptacles) and the region inside the collar in general from becoming exposed to environmental factors such as moisture, water (e.g. rain), snow, dust or sand, and other contaminants.

The prior art includes KR 10-1618739 (B1), which discloses a releasable cap ("safety cover") for an electrical plug. The cap is configured for hiding a front terminal on the plug. The cap comprises a reinforcement portion which extends to one side of the cap body, and extends at a right angle to it. A strap is connected between the reinforcement portion and a fixing clip on the power cable.

The prior art also includes www DOT evse DOT corn DOT au SLASH type-2-cable-charging.html, which discloses a charging cable for electric vehicles, wherein each plug is furnished with a releasable cap. A band, folded in concertina shape, is connected between a side portion of the cap, near the cap opening, and the power cable in the vicinity of the plug. The plug head, band and cap are moulded as one piece.

The prior art also includes EP 2485338 A1, which discloses a protection cap and a charging connector. The protection cap is connected to the plug main body via a flexible or resilient string.

The prior art also includes CN 201682134U, which discloses a charging plug with a protective cover. The protective cover is connected to the plug cable via a chain.

When the charging cable is use and connected to the vehicle, for example for charging the vehicle battery, the protective cap has been removed from the plug end and is hanging down from the plug, suspended by a band, string or chain. One problem with this plug cap type is that the cap tends to bump into the side of the vehicle bodywork (for example influenced by gusts of wind) and thereby damaging the bodywork (e.g. scratches in paint and/or dents in bodywork), because it is arranged so close to the vehicle. Another problem with the prior art plug cap type, is that the cap itself in this position is exposed to environmental factors such as moisture, water (e.g. rain), snow, dust or sand, and may become contaminated. Furthermore, if the band should snap, the cap will become irreversibly disconnected from the plug and thus easily lost or misplaced.

An object of the invention is to remedy these shortcomings of the prior art, and to introduce a protective cap that has considerable advantages over the prior art.

SUMMARY OF THE INVENTION

The invention is set forth and characterized in the main claim, while the dependent claims describe other characteristics of the invention.

It is thus provided a plug cap assembly for use on a plug having a handle portion and a head portion, said head portion comprising at least one electrical contact member and wherein at least a part of the head portion is configured for insertion into a receptacle on a vehicle having an outer body surface; the plug cap assembly comprising a plug cap configured for releasable arrangement on at least a part of the head portion, wherein the plug cap assembly comprises:
  a flexible connection member having a first end and a second end;
  a flexible connection between a cap top portion and said second end; and is characterized by:
  a connection element attached to the plug or to a cable which is connected to the plug, said connection element comprising a point of suspension for the flexible connection member;
wherein the flexible connection member is connected to, and may be moved with respect to, the connection element and the total suspended length of a suspended portion of the flexible connection member and the height of the cap may be adjusted.

The flexible connection may be a hinged connection. The flexible connection member may be a band or strap. In one embodiment, the point of suspension comprises at least one suspension structure allowing a movable suspension of the flexible connection member, such that the flexible connection member may be moved with respect to the suspension structure and the suspended length of a suspended band portion and the height of the cap may be adjusted. The flexible connection member may comprise a stopper element. In one embodiment, the flexible connection member comprises a loop portion on the cable side of the connection element.

In one embodiment, the flexible connection member is an elastic member. The connection element may be removably attached, whereby the connection element may be removed, replaced or retrofitted. The connection element may comprise a hinged or flexible portion and a locking mechanism.

In one embodiment, the connection element is attached to the handle portion. The handle portion may comprise an end portion and the connection element may be attached to or integrated with the end portion.

It is also provided a method of using the plug cap assembly according to the invention, in which the plug is inserted into a receptacle in a vehicle such that the connection element is located a distance from a portion of the vehicle body adjacent to said receptacle, characterized by adjusting the total suspended length such that the total suspended length is less than said distance.

With the invented plug cap assembly, the cap may swing freely and will not bump into the side of the vehicle bodywork. The flexible connection between the band and the cap ensures the cap interior (inside the cap collar) is protected from rain, snow, dust or sand. The cap may also be replaced, by fitting a new band or a connection element.

BRIEF DESCRIPTION OF THE DRAWINGS

These and other characteristics of the invention will become clear from the following description of an embodiment of the invention, given as a non-restrictive example, with reference to the attached schematic drawings, wherein.

DETAILED DESCRIPTION OF EMBODIMENTS OF THE INVENTION

The following description may use terms such as "horizontal", "vertical", "lateral", "back and forth", "up and down", "upper", "lower", "inner", "outer", "forward", "rear", etc. These terms generally refer to the views and orientations as shown in the drawings and that are associated with a normal use of the invention. The terms are used for the reader's convenience only and shall not be limiting.

Figure 1:
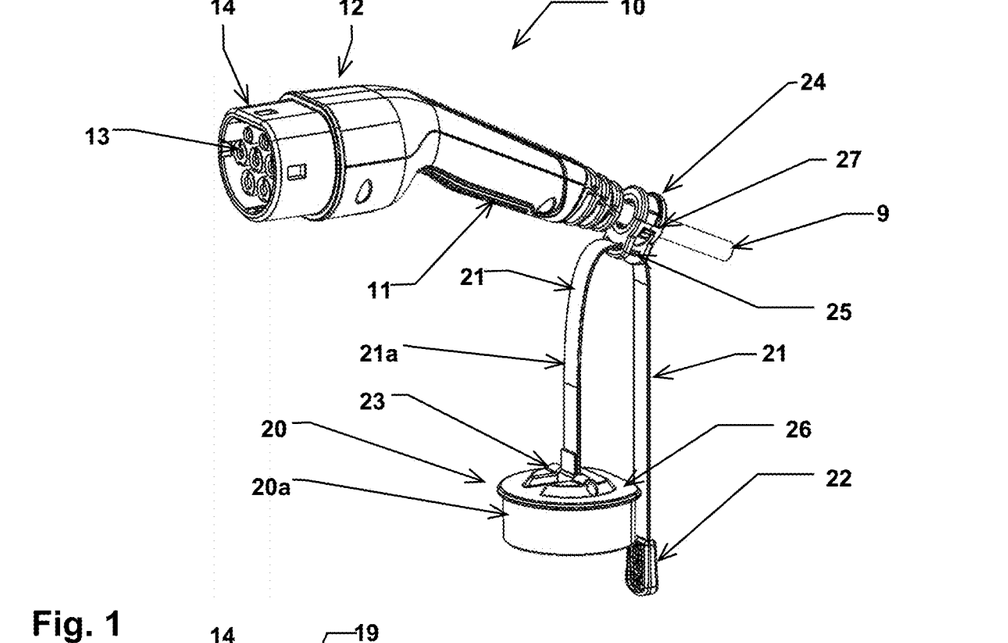
FIG. 1 is a perspective view of the invented cap arrangement, in which the cap is attached to and suspended from a cable by the flexible connection member.
Figure 2:
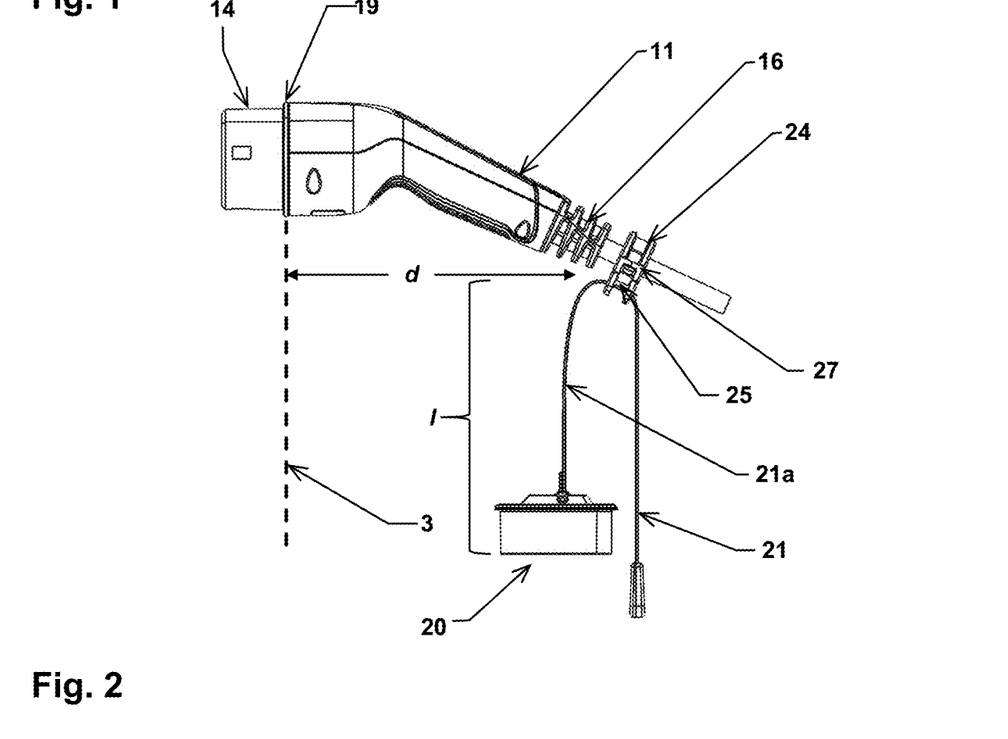
FIG. 2 is a side view of the embodiment and arrangement as shown in FIG. 1.

FIGS. 1 and 2 show a charger plug 10 which is connected to a cable 9. The plug 10, which per se is well known in the art, comprises a handle portion 11 and a head portion 12. The handle portion comprises an end portion 16, optionally flexible and ribbed, formed around a portion of the cable. The head portion comprises a plurality of female contact members (receptacles) 13 recessed in a surrounding collar 14, in the following also referred to as the plug end. The collar 14 is designed to fit into a complementary shaped receptacle (not shown) and the female receptacles 13 are designed to receive complementary shaped male contact pins (not shown), the object to be charged, for example an electric vehicle. The collar 14 is radially recessed from the remainder of the head portion 12 outer surface, whereby a shoulder 15 is formed.

The cable 9, only a part of which is shown in the figures, may extend to a charging station (not shown) in a manner which is well known in the art. A flexible connection member 21, in the illustrated embodiment in the form of a band 21, is movably connected to the cable 9 via a connection element 24 provided with suspension structures, in the illustrated embodiment in the form of slots, 25 that are configured for movable support for the flexible connection member 21. The flexible connection member 21 may thus be moved back and forth in the suspension structures (slots) 25. The connection element 24 is in the illustrated embodiment configured for releasable attachment to the cable 9, in the vicinity of the handle portion 11. In the illustrated embodiment, the connection element 24 comprises a hinged or flexible portion (not shown) on one side and a locking mechanism 27 on the opposite side. The locking mechanism 27 (e.g. a snap-lock device) may be opened and closed by a user, whereby a connection element 24 may be removed, replaced or retrofitted. The connection element 24 may be dimensioned such that it fits snugly around the cable and thus is stationary with respect to the cable, or may have a loose fit around the cable. In another embodiment (see FIG. 9 and associated description below) the connection element 24 is attached to the handle portion 11. It should also be understood that a one-slot configuration is conceivable. A stopper element 22 is attached to one (a first) end of the flexible connection member 21 in order for that end to be pulled through the slots 25. The other (a second) end of the flexible connection member (band) 21 is connected to a top portion 26 of a cap 20. The cap is intended to be placed over the plug collar 14 when the plug is not in use (as shown in FIGS. 3 and 4) serves a function to cover and protect the contact members 13.

The flexible connection member (band) 21 second end is in the illustrated embodiment connected to the cap top portion 26 via a flexible connection 23, whereby the cap is oriented with the top portion 26 substantially horizontally and the cap collar 20a pointing downwards, when the cap 20 is suspended by the band 21 as shown in FIGS. 1 and 2. The flexible connection 23 may be a hinged connection or other connection which allows the cap to assume the orientation as shown in FIGS. 1 and 2.

Figure 3:
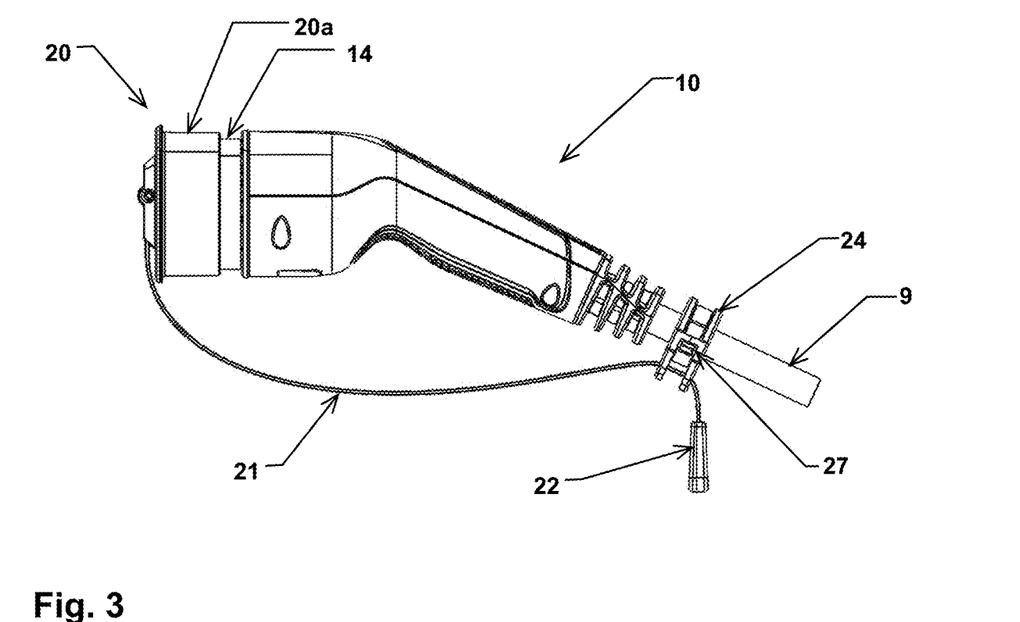
FIG. 3 is a perspective view of the embodiment illustrated in FIGS. 1 and 2, where the cap is placed on the plug end.
Figure 4:
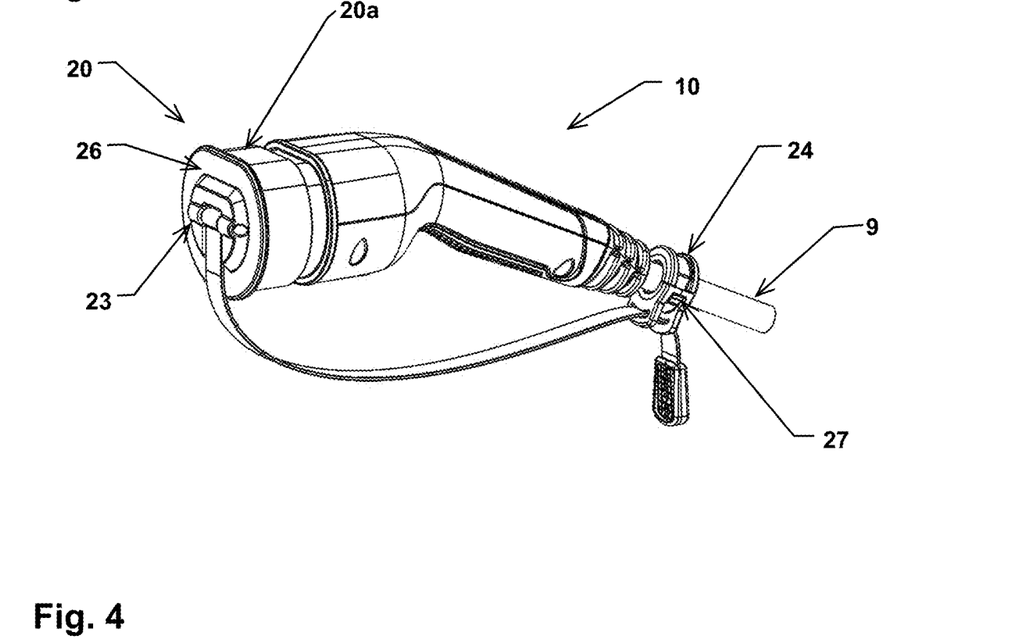
FIG. 4 is a side view of the embodiment and arrangement as shown in FIG. 3.

When the plug 10 is not in use, the cap is placed over the plug end and the band is pulled through the slots 25, as shown in FIGS. 3 and 4. A sufficient length of the band 21, combined with the stopper 22, ensures that the band first end is not pulled through the slots.

When the plug 10 is in use for its intended purpose, it is inserted into a receptacle (not shown), for example on a vehicle, and the cap is suspended by a portion of the band 21, as shown in FIGS. 1 and 2. That portion of the flexible connection member (band) 21 which is on the same side of the slots 25 as the cap 20, is identified with reference number 21a. In FIG. 2, a vehicle body 3 is indicated by a dotted line. In this configuration, the band is pulled so far back that the total suspended length/(the length of the band portion 21a and the height of the cap) is less than the distance d (the distance between the body 3 and the point of suspension for the band portion 21a). This prevents the cap from impinging on the vehicle body 3. Also, the flexible (for example hinged) connection 23 ensures that the cap collar 20a always points downwards, whereby accumulation of dust, water or snow is prevented. The cap is preferably manufactured of a plastic or rubber material.

Figure 5:
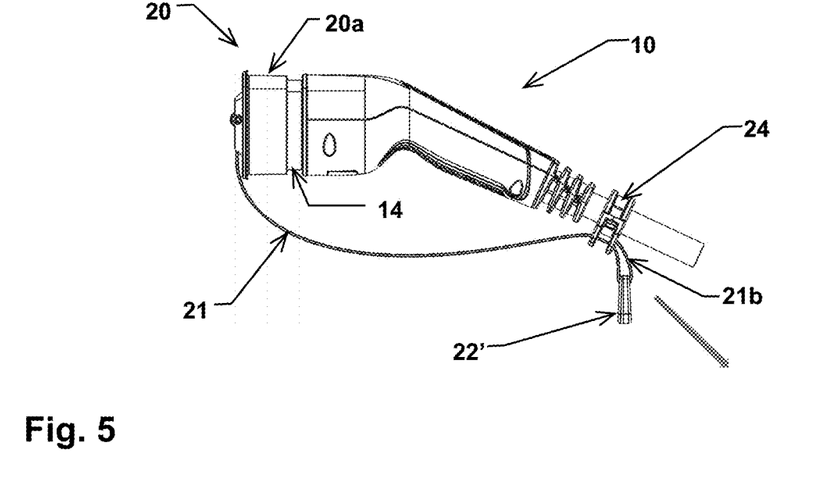
FIG. 5 is a side view corresponding to that of FIG. 3, but illustrating another embodiment of the flexible connection member.
Figure 6:
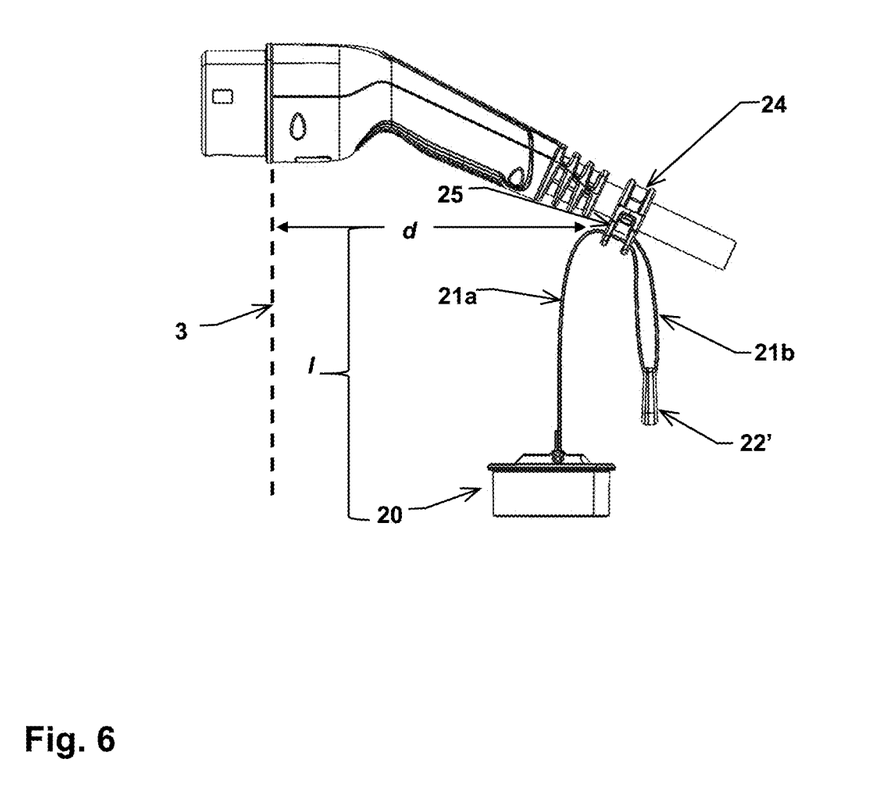
FIG. 6 is a side view of the same embodiment as illustrated in FIG. 5, showing the cap being attached to and suspended from a cable by the flexible connection member.

FIGS. 5 and 6 illustrate another embodiment of the flexible connection member 21, in the illustrated embodiment a band (or strap). In this embodiment, the above mentioned first end of the band 21 is fixedly attached to the connection element 24, whereby a loop portion 21b is formed on the cable side of the connection element 24. A modified stopper element 22' is slidably connected to the loop portion 21b. When the plug 10 is in use for its intended purpose, as described above with reference to FIG. 2, a user may pull back on the stopper element 22' (as indicated by the arrow in FIG. 5) to enlarge the loop portion 21b such that the total suspended length/(the length of the band portion 21a and the height of the cap) is less than the distance d (the distance between the body 3 and the point of suspension for the band portion 21a), as shown in FIG. 6. This prevents the cap from impinging on the vehicle body 3.

Figure 7:
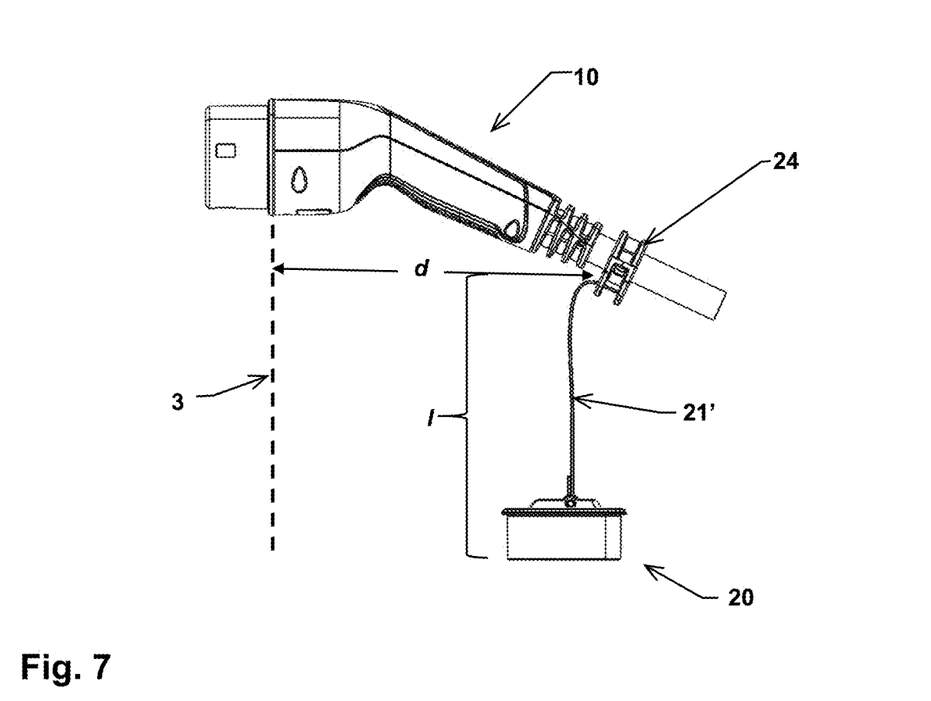
FIG. 7 is a side view corresponding to that of FIG. 3, but illustrating yet another embodiment of the flexible connection member.
Figure 8:
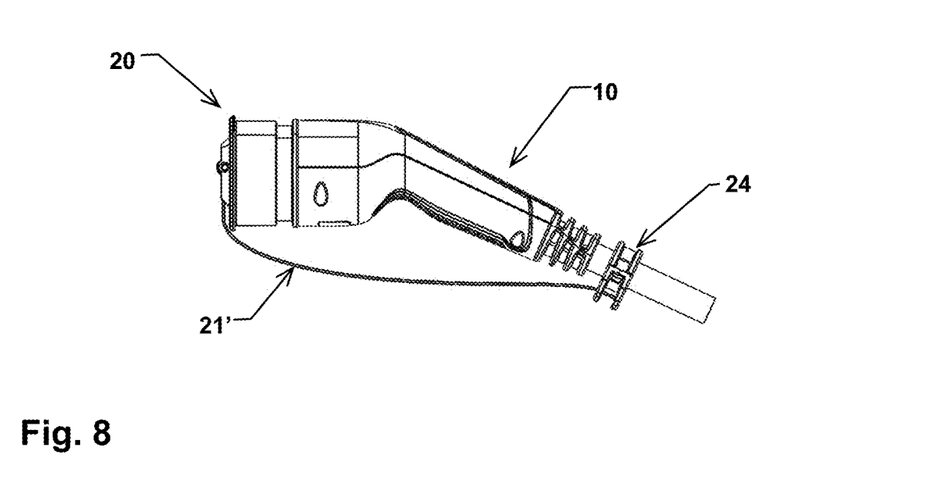
FIG. 8 is a side view of the same embodiment as illustrated in FIG. 7, showing the cap being attached to and suspended from a cable by the flexible connection member.

FIGS. 7 and 8 illustrate yet another embodiment, in which the flexible connection member 21' is fixedly attached to the connection element 24 and comprises an elastic material. In FIG. 7, the plug 10 is illustrated as being in use for its intended purpose, as described above with reference to FIG. 2. Here, the elastic connection member (such as an elastic band) 21' is in its relaxed (unstretched) state and thus dimensioned such that the total suspended length/(the length of the elastic band 21' and the height of the cap) is less than the distance d (the distance between the body 3 and the point of suspension for the band portion 21a). This prevents the cap from impinging on the vehicle body 3. When the plug 10 is not in use, the cap 20 is placed over the plug end and the elastic band 21' is extended (stretched) as shown in FIG. 8.

Figure 9:
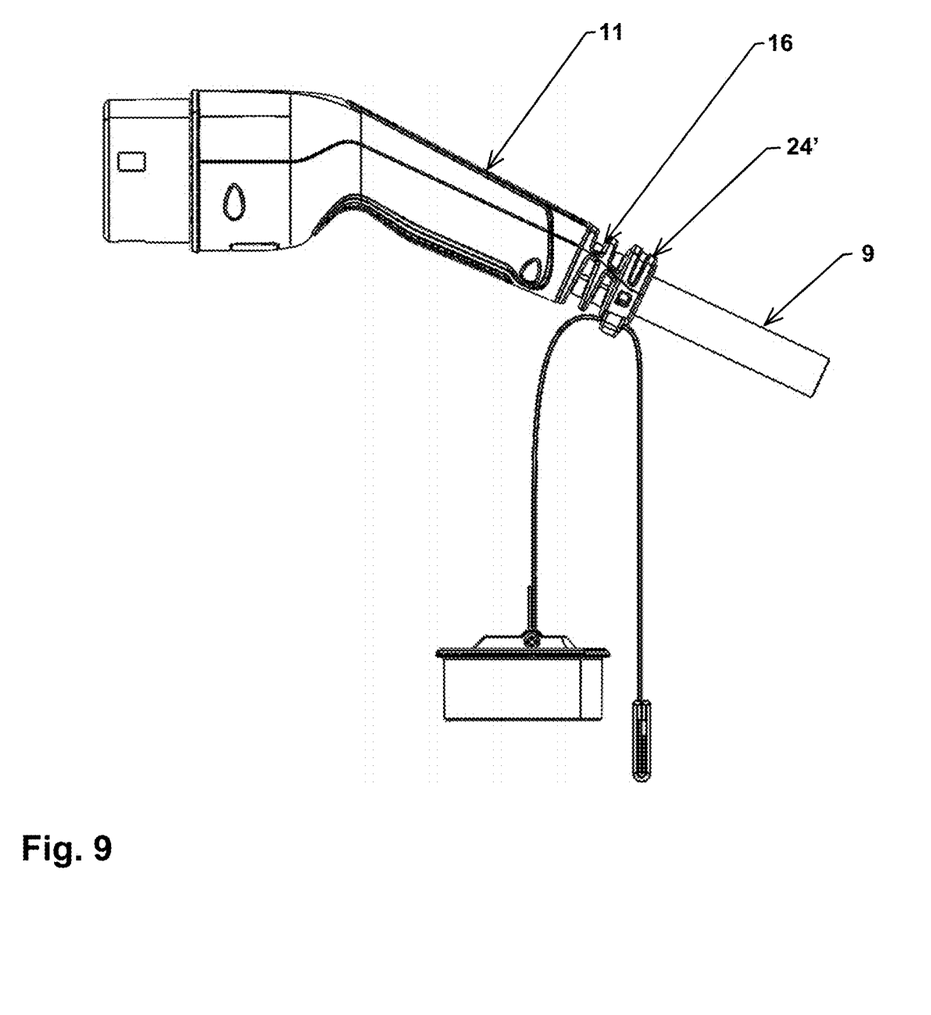
FIG. 9 is a side view which illustrates another embodiment of the connection element.

FIG. 9 illustrates an embodiment of the invention in which the connection element (denoted 24') is attached to the handle portion 11. More specifically, the connection element 24' is an integral part of the end portion 16. Although not illustrated, the connection element may be attached to other portions of the handle portion. It should be understood that this embodiment may be combined with any one of the embodiments described above.

Although the invention has been described with reference to a plug having a head portion with a number of female receptacles recessed in a protective collar, it should be understood that the invention is equally applicable for use on a plug with pins (male ends) for insertion into a receptacle.

Aspects

Aspect A. A plug cap assembly for use on a plug (10) having a handle portion (11) and a head portion (12), said head portion (12) comprising at least one electrical contact member (13) and wherein at least a part of the head portion is configured for insertion into a receptacle on a vehicle having an outer body surface (3); the plug cap assembly comprising a plug cap (20) configured for releasable arrangement on at least a part of the head portion, wherein the plug cap assembly comprises:
- a flexible connection member (21; 21') having a first end and a second end;
- a flexible connection (23) between a cap top portion (26) and said second end; and is characterized by
- a connection element (24; 24') attached to the plug or to a cable (9) which is connected to the plug, said connection element comprising a point of suspension for the flexible connection member;

wherein the flexible connection member (21; 21') is connected to, and may be moved with respect to, the connection element (24; 24') and the total suspended length (l) of a suspended portion (21a) of the flexible connection member and the height of the cap (20) may be adjusted.

Aspect B. The plug cap assembly of aspect A, wherein the flexible connection (23) is a hinged connection.

Aspect C. The plug cap assembly of aspect A or aspect B, wherein the flexible connection member (21) is a band or strap.

Aspect D. The plug cap assembly of any one of aspects A-C, wherein the point of suspension comprises at least one suspension structure (25) allowing a movable suspension of the flexible connection member (21), such that the flexible connection member may be moved with respect to the suspension structure and the suspended length (l) of a suspended band portion (21a) and the height of the cap (20) may be adjusted.

Aspect E. The plug cap assembly of any one of aspects A-D, wherein the flexible connection member (21) comprises a stopper element (22; 22').

Aspect F. The plug cap assembly of any one of aspects A-E, wherein the flexible connection member (21) comprises a loop portion (21b) on the cable side of the connection element (24; 24').

Aspect G. The plug cap assembly of any one of aspects A-C, wherein the flexible connection member is an elastic member (21').

Aspect H. The plug cap assembly of any one of aspects A-G, wherein the connection element (24; 24) is removably attached, whereby the connection element (24) may be removed, replaced or retrofitted.

Aspect I. The plug cap assembly of aspect H, wherein the connection element (24; 24') comprises a hinged or flexible portion and a locking mechanism (27).

Aspect J. The plug cap assembly of any one of aspects A-I, wherein the connection element (24') is attached to the handle portion (11).

Aspect K. The plug cap assembly of aspect J, wherein the handle portion (11) comprises an end portion (16) and the connection element (24') is attached to or integrated with the end portion (16).

Aspect L. A method of using the plug cap assembly according any one of the aspects A-K, in which the plug is inserted into a receptacle in a vehicle such that the connection element (24) is located a distance (d) from a portion of the vehicle body (3) adjacent to said receptacle, characterized by adjusting the total suspended length (l) such that the total suspended length (l) is less than said distance (d).

The invention claimed is:

1. A plug cap assembly for use on a plug having a handle portion and a head portion, said head portion comprising at least one electrical contact member and wherein at least a part of the head portion is configured for insertion into a receptacle on a vehicle having an outer body surface; the plug cap assembly comprising a plug cap configured for releasable arrangement on at least a part of the head portion, wherein the plug cap assembly comprises:
- a flexible connection member having a first end and a second end;
- a flexible connection between a cap top portion and said second end;

and
- a connection element attached to the plug or to a cable which is connected to the plug, said connection element defining one of a plurality of possible points of suspension along the flexible connection member; wherein said points of suspension lie between the first and second ends of the flexible connection member; wherein the flexible connection member is connected to, and may be moved with respect to, the connection element.

2. The plug cap assembly of claim 1, wherein the flexible connection is a hinged connection.

3. The plug cap assembly of claim 1, wherein the flexible connection member is a band or strap.

4. The plug cap assembly of claim 1, wherein the connection element comprises at least one suspension structure such that the flexible connection member may be moved with respect to the suspension structure changing the point of suspension along the flexible connection member and a total suspended length of a suspended portion of the flexible connection member and the hanging height of the cap may be adjusted.

5. The plug cap assembly of claim 1, wherein the flexible connection member comprises a stopper element.

6. The plug cap assembly of claim 1, wherein the flexible connection member comprises a loop portion on the cable end of the connection element.

7. The plug cap assembly of claim 1, wherein the flexible connection member is an elastic member.

8. A method of using the plug cap assembly according claim 1, in which the plug is inserted into a receptacle in a vehicle such that the connection element is located a distance from a portion of the vehicle body adjacent to said receptacle, comprising:
   adjusting the total suspended length such that the total suspended length is less than said distance.

9. The plug cap assembly of claim 1, wherein the connection element is removably attached, whereby the connection element may be removed, replaced or retrofitted.

10. The plug cap assembly of claim 9, wherein the connection element comprises a hinged or flexible portion and a locking mechanism.

11. The plug cap assembly of claim 1, wherein the connection element is attached to the handle portion.

12. The plug cap assembly of claim 11, wherein the handle portion comprises an end portion and the connection element is attached to or integrated with the end portion.

* * * * *